United States Patent [19]

Gandhi et al.

[11] 4,389,382

[45] Jun. 21, 1983

[54] METHOD OF USING A SIMPLIFIED LOW COST CATALYST SYSTEM

[75] Inventors: Haren S. Gandhi, Farmington Hills; Karen M. Adams, Dearborn Heights, both of Mich.

[73] Assignee: Ford Motor Company, Dearborn, Mich.

[21] Appl. No.: 284,763

[22] Filed: Jul. 20, 1981

[51] Int. Cl.³ .................. B01D 53/36; B01J 23/68
[52] U.S. Cl. .................. 423/213.5; 423/213.7; 423/235; 252/465; 252/466 PT; 252/477 R
[58] Field of Search .................. 423/213.5, 213.7, 239; 252/465, 466 PT, 477

[56] References Cited

U.S. PATENT DOCUMENTS 3,554,929  1/1971  Aarons .................. 423/213.5 X
3,910,770 10/1975  Robylinski et al. .......... 423/213.7
3,914,377 10/1975  Anderson et al. .......... 423/213.7

FOREIGN PATENT DOCUMENTS 52-54670  5/1977  Japan .................. 423/239 A

*Primary Examiner*—Earl C. Thomas

*Attorney, Agent, or Firm*—William E. Johnson; Olin B. Johnson

[57] ABSTRACT

There is disclosed a method of using an exhaust gas catalyst for treatment of exhaust gases developed by burning a hydrocarbon based fuel in an internal combustion engine. These exhaust gases contain varying amounts of unburned hydrocarbons, carbon monoxide and oxides of nitrogen depending upon the operating conditions of the internal combustion engine. This specification teaches use of an improved catalyst composition in which a support medium is provided for supporting the catalyst system, the support medium having an upstream support portion and a downstream support portion over which the exhaust gases pass in succession. The upstream support portion of the support medium has palladium deposited thereon and the downstream support portion of the support medium has tungsten deposited thereon. The catalyst system has particular utility as a three-way catalyst operating at approximately stoichiometric conditions or as a catalyst for use in conjunction with the fast burn engines or as an oxidation catalyst.

13 Claims, 4 Drawing Figures

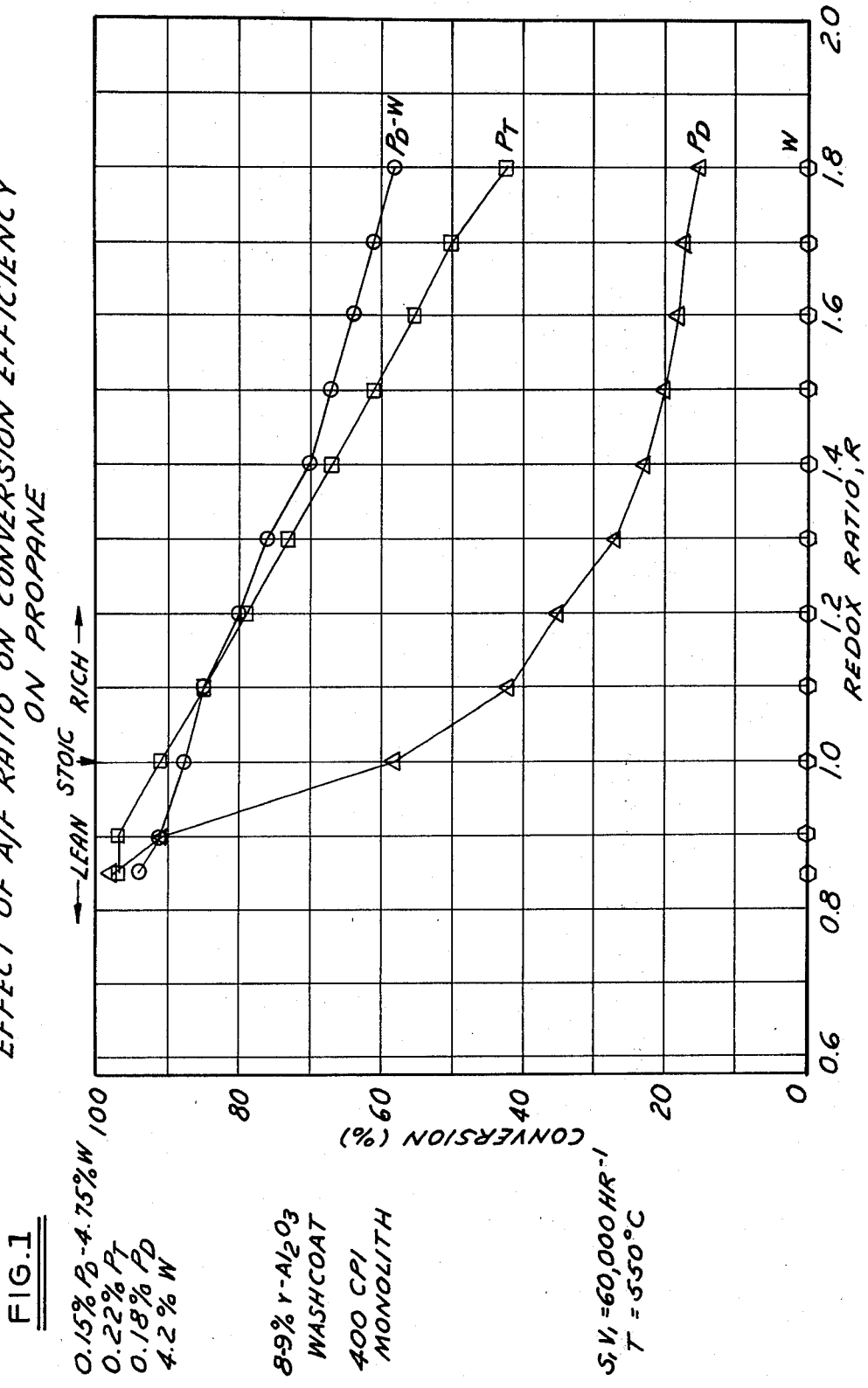

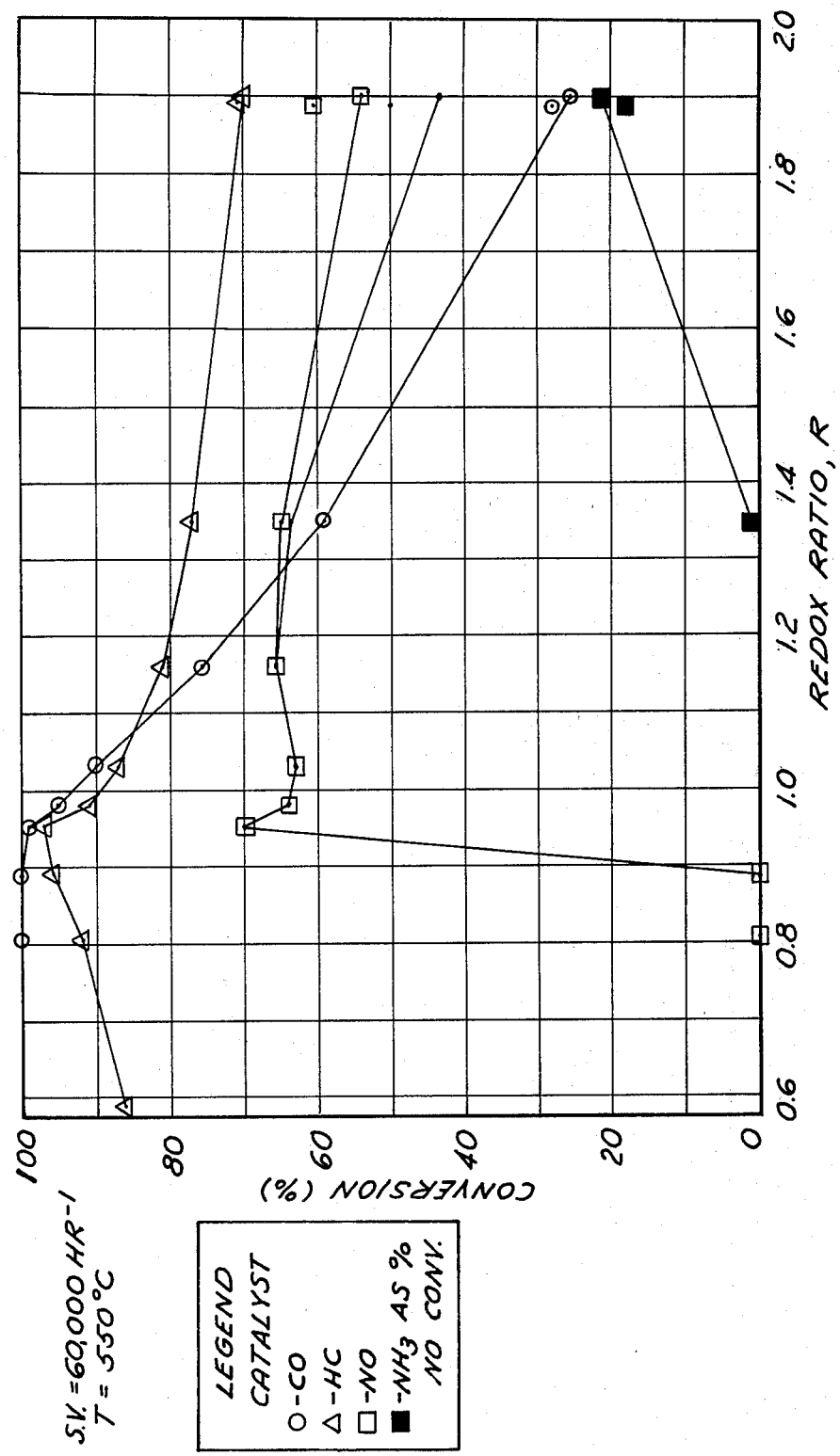

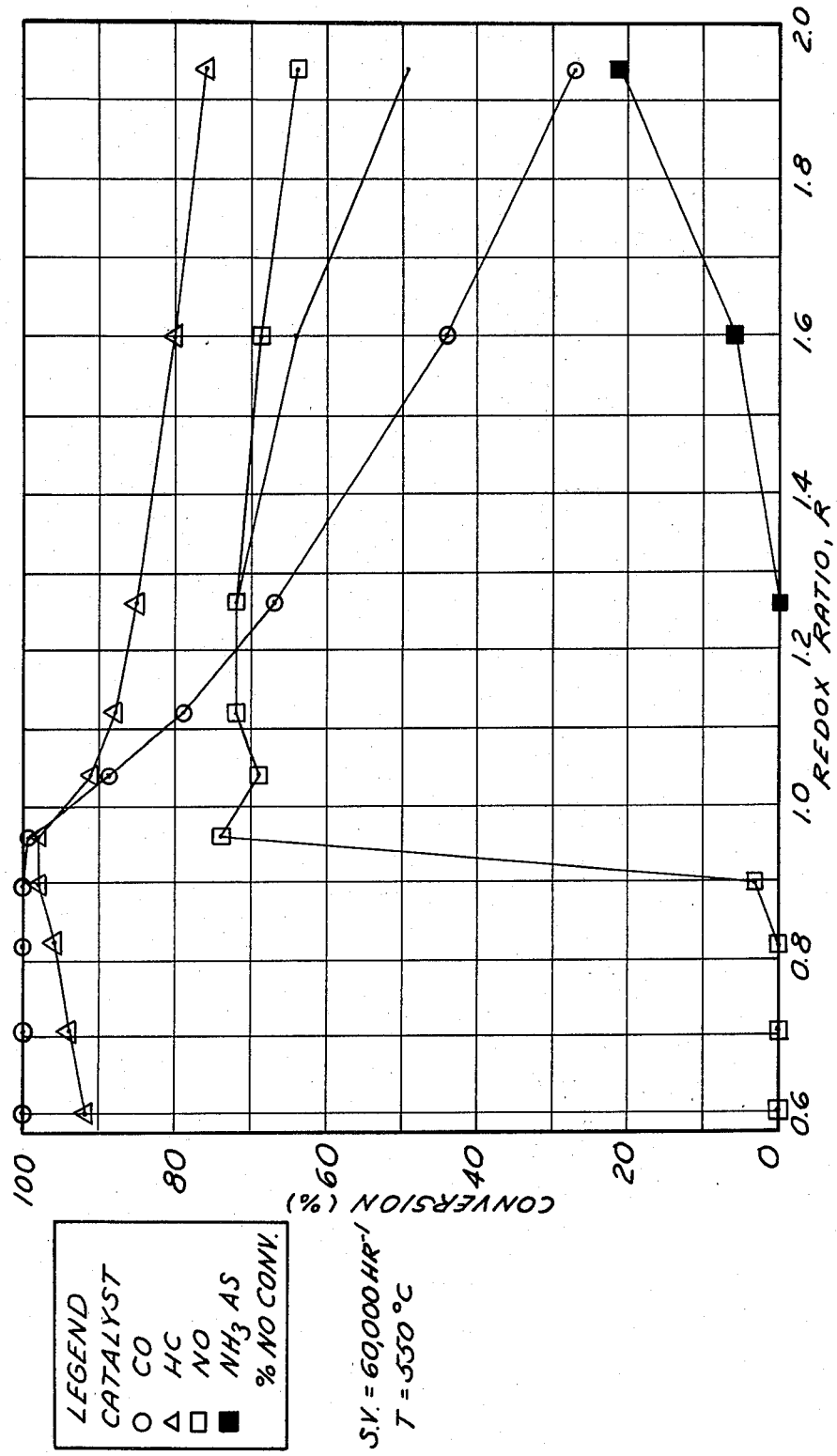

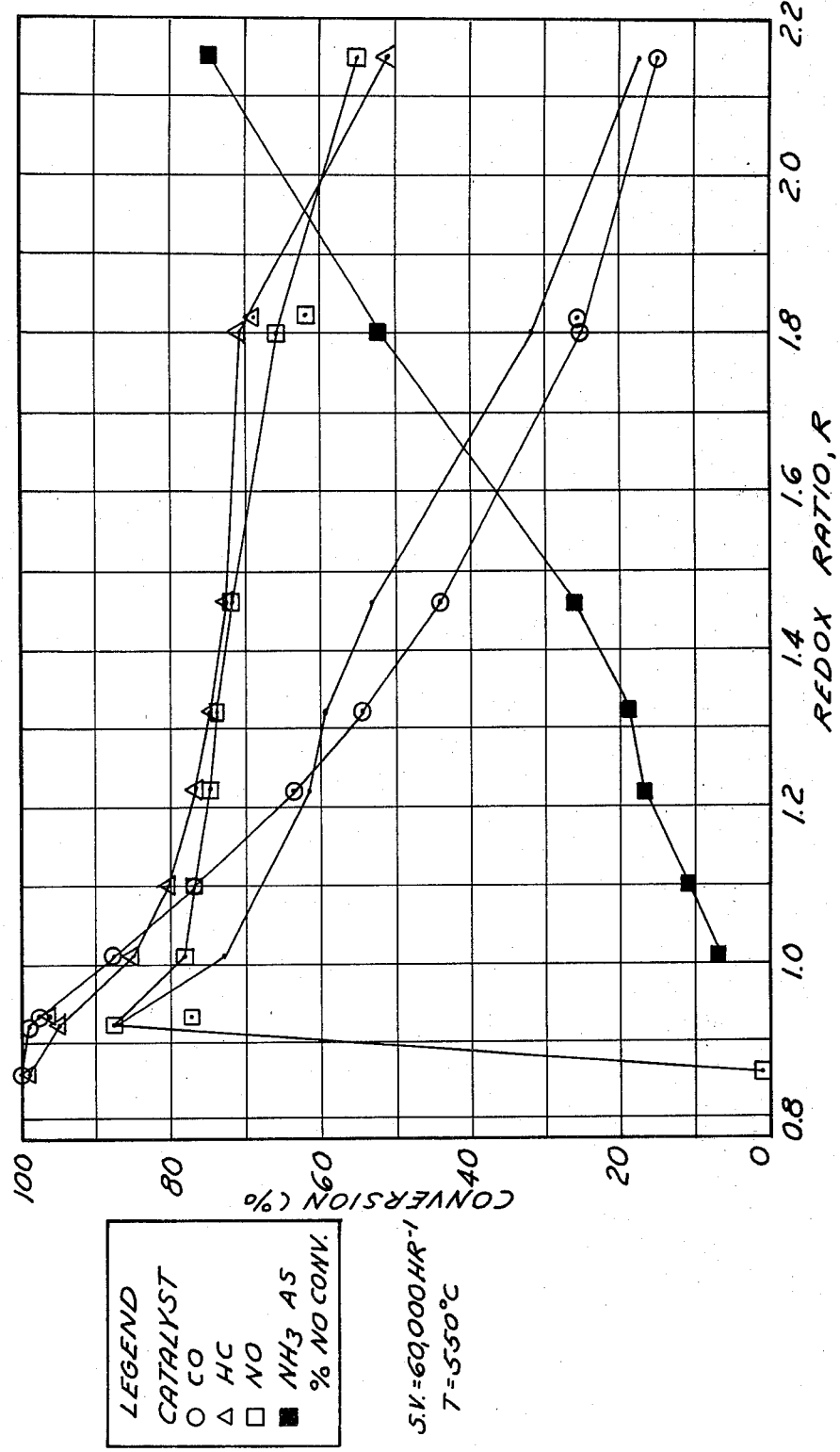

METHOD OF USING A SIMPLIFIED LOW COST CATALYST SYSTEM

BACKGROUND OF THE INVENTION AND PRIOR ART STATEMENT

No prior art search was conducted on the subject matter of this specification in the U.S. Patent Office or in any other search facility.

We are unaware of any prior art that is relevant to the catalyst system taught in this specification other than the teachings contained in our own applications, Ser. No. 284,759, entitled "Palladium Catalyst Promoted By Tungsten", and Ser. No. 284,762, entitled "Low Cost Catalyst System", both filed on even date herewith. Our other applications are assigned to the same assignee as this application and are hereby incorporated by reference. Our first mentioned other application teaches a specific catalyst system in which a palladium catalyst is promoted by tungsten. The catalyst system disclosed in that application has highly desirable characteristics in that it is effective in the catalytic oxidation of unburned hydrocarbons and the catalytic reduction of oxides of nitrogen without significant production of ammonia when an internal combustion engine with which it is associated is operated under fuel rich (oxygen deficient) conditions.

The disclosure of the present specification teaches use of a catalyst formulation which we also consider to be unique. This unique catalyst formulation contains, on a suitable catalyst substrate, both an upstream catalyst portion containing palladium and a downstream catalyst portion containing tungsten.

The catalyst formulation set forth in this specification is one which finds utility in several areas. The catalyst system may be used as a three-way catalyst for association with an internal combustion engine which is operated under stoichiometric or slightly fuel rich conditions. The catalyst formulation disclosed is also one which may be used as an oxidation catalyst in association with oxygen rich exhaust gases from an internal combustion engine. Such gases may be developed, for example, by operation of an internal combustion engine under oxygen rich (fuel deficient) conditions. In another case, exhaust gases, though oxygen deficient, may have oxygen added thereto to make the overall gases oxygen rich prior to movement over such an oxidation catalyst. Still another significant use that may be made of this catalyst formulation is in the area of fast burn engines or for engines calibrated from an optimum fuel economy and emissions standpoint. The same catalyst formulation can be operated fuel rich under high power demand acceleration mode or fuel lean under deceleration or cruise conditions, giving a wide range of flexibility for engine calibration to optimize fuel economy and emissions over a wide range of air/fuel ratios.

The catalyst formulation disclosed herein is structured upon a palladium based catalyst and a tungsten based catalyst. Palladium is a catalyst material which is considerably less expensive than platinum, which has been known in the past for uses in oxidation catalyst systems. Tungsten, of course, is a base metal and is much less expensive than noble metals such as platinum and rhodium.

It is a principal object of the present invention to provide a simplified low-cost catalyst system which may be used by the catalyst designer in at least three principally different types of catalyst systems. It is a secondary object of this invention to provide a low-cost catalyst system that functions efficiently in no matter what type of system the catalyst designer has placed in the catalyst system.

As is well known to a skilled artisan, an internal combustion engine normally associated with an automobile will generally operate on both sides of a stoichiometric air/fuel ratio during various modes of engine operation. However, the engine designer at the outset of the design of the engine will select an engine operating mode under which the internal combustion engine will normally operate. For example, the so-called fast burn engines currently under development are designed to operate slightly fuel deficient during normal cruising modes of the vehicle. At such time, there is more air present than is required to oxidize the fuel. Therefore, the overall operating mode of the system is oxidizing and the catalyst materials present are operating under oxidizing conditions. In other modes of engine operation, for example, during acceleration periods, internal combustion engines associated with automotive vehicles are normally operated on the rich side of stoichiometry. In this condition, there is more fuel present than air to oxidize the same. In such a case, the overall catalyst system is exposed to reducing conditions because there is not sufficient oxygen available over the catalyst system.

When used with a fast burn internal combustion engine, the catalyst system of the present invention is one which under oxidizing conditions is effective in the catalytic oxidation of unburned hydrocarbons and carbon monoxide, and under reducing conditions, is effective not only in the catalytic oxidation of unburned hydrocarbons and carbon monoxide, but also in the catalytic reduction of oxides of nitrogen without significant production of ammonia. The catalyst system disclosed in this specification has these excellent characteristics when associated with a fast burn internal combustion engine, even though it uses catalyst materials substantially less expensive than a material such as platinum.

The catalyst system of this invention also has excellent characteristics when used with a conventional slow burn type of internal combustion engine and when used with such an internal combustion engine either as a three-way catalyst or as an oxidation catalyst.

SUMMARY OF THE INVENTION

This invention relates to use of a catalyst system in which a palladium based catalyst is followed by a tungsten based catalyst. More particularly, this invention relates to such a catalyst system for use as an exhaust gas catalyst for treatment of exhaust gases developed by burning a hydrocarbon fuel or hydrocarbon based fuels such as fuels containing hydrocarbons and alcohol blends in an internal combustion engine.

In accordance with the teachings of this invention, an exhaust gas catalyst is provided for treatment of exhaust gases developed by burning a hydrocarbon fuel or a fuel containing hydrocarbon and alcohol blends in an internal combustion engine. The exhaust gases contain various amounts of unburned hydrocarbons, carbon monoxide and oxides of nitrogen depending upon the operating conditions of the internal combustion engine.

The improved catalyst composition is formulated in the following manner. There is initially provided a support medium for supporting the catalyst system. The support medium has both an upstream support portion over which exhaust gases initially flow and a downstream support portion over which exhaust gases flow after passing over the upstream support portion thereof. Palladium is deposited on the upstream support portion. Tungsten is supported on the downstream support portion of the support medium.

It is understood by those skilled in the art that other catalyst materials, materials for protecting the catalyst materials, and materials for promoting the catalyst materials may also be present on the support medium to carry out those functions already well known to the skilled artisan.

By way of instruction and not by way of limitation to the scope of our invention, some particular details of a catalyst system falling within the scope of our invention are set forth herein. The support medium for the catalyst may be a monolithic substrate in which one half of the substrate forms the upstream support portion and the other half of the substrate forms the downstream support portion. The support medium may be a pelletized substrate or even a metallic substrate, if desired.

If a monolithic substrate is selected, it may be washcoated in its entirety with from 5% to 25% by weight of the catalyst substrate of gamma alumina. Thereafter, from 0.02 to 1.0 weight percent of finely divided palladium by weight of the substrate may be placed on the upstream support portion of the substrate. On the downstream support portion of the substrate, 0.2 to 10.0 weight percent of the substrate of tungsten may be placed thereon. The preferred concentration varies from 0.5 weight percent to 5.0 weight percent tungsten.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, in which:

FIG. 1 is a graphical presentation of data on the effect of redox ratio on the conversion efficiency of propane over various catalyst systems as noted in the Figure;

FIG. 2 is a graphical presentation of data on the effect of redox ratio on the conversion efficiency of oxides of nitrogen, carbon monoxide and hydrocarbons over a catalyst system containing a substrate having 9% by weight gamma alumina over its entire extent, and over a first half or upstream support portion thereof, 0.18% by weight palladium, and over a downstream half thereof, 4.2% by weight tungsten;

FIG. 3 is a graphical presentation of data on the effect of redox ratio on conversion efficiency of oxides of nitrogen, carbon monoxide and hydrocarbons over a catalyst system containing a substrate having 9% by weight gamma alumina over its entire extent, and over a first half or upstream support portion thereof, 0.18% by weight palladium, and over a downstream half thereof, 0.15% by weight palladium/4.75% weight tungsten; and FIG. 4 is a graphical presentation of data on the effect of redox ratio on conversion efficiency of oxides of nitrogen, carbon monoxide and hydrocarbons over a catalyst system containing a substrate having 8% by weight gamma alumina over its entire extent, along with 0.18% by weight palladium over its entire extent.

DESCRIPTION OF THE PREFERRED EMBODIMENT

The following description is what we consider to be a preferred embodiment of the use of our catalyst system. The following description also sets forth what we now contemplate to be the best mode of carrying out the use and fabrication of our catalyst system. This description is not intended to be a limitation upon the broader principles of this catalyst system.

In order to disclose the use of the catalyst system of this invention, we desire to demonstrate the catalytic activity of three different catalyst systems with respect to the effect of the redox ratio on the conversion efficiency of that catalyst system on oxides of nitrogen, carbon monoxide and unburned hydrocarbons. The three catalyst systems are demonstrated in FIGS. 2, 3 and 4. The first system is a two-zone catalyst system in which the first zone is palladium the second zone is tungsten, the second is also a two-zone catalyst system in which the first zone is palladium and the second zone is palladium/tungsten, the third is a palladium only system. The catalyst system whose data is reported in FIG. 2 is a catalyst within the scope of catalyst systems disclosed and claimed in this specification.

To illustrate the manufacture of a catalyst system, detailed instructions will be given for the manufacture of a catalyst system in accordance with our invention, namely, one containing palladium on an upstream portion of the catalyst support and tungsten on a downstream portion of the catalyst support. The other catalyst systems disclosed herein may be manufactured using the same general procedures simply by selection of the appropriate elements as needed.

The preparation of a preferred catalyst system in accordance with this invention is as follows. The preferred catalyst system of this invention has the data generated thereon as set forth in FIG. 2. The preferred catalyst system will be one which has a catalyst support medium having an upstream support portion over which exhaust gases initially flow and a downstream support portion over which exhaust gases flow after passing over the upstream support portion thereof. The upstream support portion will have palladium thereon, while the downstream support portion will have tungsten thereon as the principal catalyst elements. The preparation of this preferred catalyst system is initiated by coating a cordierite honeycomb substrate (400 square cells per inch, 6 mil wall thickness) as available from Corning Glass Company, using gamma alumina washcoat. After coating with the gamma alumina, the substrate is calcined at 600° C. for a period of 3 to 4 hours. This substrate has approximately 9% by weight of the substrate of gamma alumina contained thereon.

The tungsten is impregnated on the downstream support portion of the support media over the gamma alumina which has been previously placed thereon. The tungsten is placed on the substrate by using a solution of $H_2WO_4$ in concentrated $NH_4OH$. This solution is dried on the coated substrate at a temperature of 130° C. and then calcined at 300° C. for a time period of 3 to 4 hours. The tungsten is placed by this process onto the downstream support portion of the substrate in a finely divided manner and is present as approximately 4.2% by weight of the weight of the substrate.

The palladium is impregnated onto the upstream support portion of the support medium using an acidic aqueous solution of palladium chloride (4%/vol. in concentrated HNO₃). This solution is dried on the substrate at 130° C. and then calcined at 500° C. for a time period of 3 to 4 hours. This results in approximately 0.18% by weight of the substrate of palladium being applied to the substrate over its upstream support portion.

Although this preferred embodiment was prepared as outlined above, there are a number of ways that a skilled artisan can vary the preparation. For example, instead of impregnating tungsten and gamma alumina in two consecutive steps on the downstream support portion of the support medium this process can be combined into one step. Also, the gamma alumina need not be coated on a honeycomb, but may be coated onto different support configurations such as a metallic substrate as required for different applications. Pelleted or extruded alumina can be used as a support medium in place of a monolithic support. In this case, one does not need a high surface area alumina washcoating step.

Reference is now made to FIGS. 1, 2, 3 and 4 so that the benefits of the use of the catalyst system of this invention may be better understood.

In FIG. 1 there is shown the effect of redox ratio upon the conversion efficiency of particular noted catalysts for converting propane to carbon dioxide and water vapor. This Figure indicates that tungsten has no ability for converting propane, regardless of redox potential. Palladium, by itself, is also shown to be a poor catalyst for converting propane at redox ratios of more than 0.9. Platinum and a combined palladium/tungsten catalyst are shown to be the best catalysts for converting propane.

FIG. 1 demonstrates that neither palladium nor tungsten, by themselves, at a redox ratio greater than 0.9, are particularly efficient for the conversion of the relatively simple hydrocarbon propane. However, subsequent Figures will indicate that if the two materials, palladium and tungsten, are placed one behind the other on a catalyst substrate, their efficiency for conversion of hydrocarbons, which includes propane, is enhanced compared to the palladium only catalyst (FIG. 4).

In the catalyst system of this specification, the catalyst substrate is divided into an upstream support portion and a downstream support portion. Both the upstream support portion and the downstream support portion contain, in a preferred test embodiment from which data was developed for presentation in FIG. 2, 9% by weight of the substrate gamma alumina. The upstream support portion and the downstream support portion of the substrate were generally two portions of the substrate placed back to back. The downstream support portion of the substrate contained 4.2% by weight of that portion of the substrate of tungsten, while the upstream portion of the substrate contained 0.18% by weight of the substrate of palladium. Thus, the upstream portion of the substrate has palladium thereon, while the downstream portion of the substrate has tungsten thereon. The significant thing to note about this new combination is that the net $NO_x$ conversion efficiency was greatly increased compared to palladium at redox ratios greater than 1.15. The amount of ammonia formed, as compared to oxides of nitrogen converted, remained extremely low over most redox ratios. This catalyst system also has a good ability in converting unburned hydrocarbons such as propane across a significant range of redox ratios.

FIG. 2 graphically illustrates that the catalyst made in accordance with the teachings of a preferred embodiment of this invention would serve as an excellent three-way catalyst. Such a catalyst normally operates at a redox ratio of about 1.0 plus or minus 0.05 units. In this range, the efficiencies for the catalyst system in conversion of oxides of nitrogen, unburned hydrocarbons and carbon monoxide is very good. In fact, one may say the conversion efficiency, if used as a three-way catalyst, is excellent because it is based upon relatively inexpensive catalyst materials rather than the more costly platinum or rhodium which have been used in the past.

FIG. 3 is a graphical presentation of data obtained on a catalyst system similar to that tested in FIG. 2. The sole exception in this situation was that the downstream portion of the catalyst system not only had tungsten thereon, but also 0.15% by weight of the downstream portion of the substrate of palladium. The purpose of the palladium and tungsten together is to increase the ability to convert unburned hydrocarbons to carbon monoxide and water vapor.

In FIG. 4 there is shown the effect of redox ratio on the conversion efficiency for oxides of nitrogen, carbon monoxide and unburned hydrocarbons over a catalyst system coated uniformly with 0.18% by weight of the substrate palladium and 8% by weight of the substrate gamma alumina. This particular Figure shows that a palladium only catalyst is one which has poor selectivity. By poor selectively we mean that the catalyst produces an unusual amount of ammonia as a percentage of the oxides of nitrogen converted by the catalyst. This is particularly true as the redox ratio moves up from approximately 1.0. For example, when compared to the conversion efficiency of the catalyst detailed in FIG. 2, the palladium only catalyst, at a redox ratio of 1.6, converts approximately 36% of converted oxides of nitrogen into ammonia, whereas the catalyst shown in FIG. 2, which is the palladium catalyst followed by a tungsten catalyst, results in no more than 10% of the converted oxides of nitrogen going to ammonia. The system in which a palladium catalyst is followed by a palladium/tungsten catalyst, as depicted in FIG. 3, results, at a redox ratio of 1.6, in the conversion of about 5% of any converted oxides of nitrogen going to ammonia.

It is understood that many different materials may find their way onto a catalyst substrate for a particular use. For example, certain materials are put on the catalyst substrate in order to stabilize the gamma alumina catalyst washcoat. Also, other washcoat material such as zirconia or alpha alumina may be used and these also may have their stabilizing elements. As an additional matter, stabilizing elements may be present for stabilizing the catalyst materials under certain operating conditions, for example, under oxidizing or reducing conditions. In a similar manner, materials also find their way onto the catalyst substrate in order to promote catalyst activity or to ensure the action of the stabilizer material. The appended claims are not to be construed so as to eliminate such materials from the catalyst system of our invention. Our predominant invention is that the combination of a palladium based catalyst and a tungsten based catalyst in a catalyst system in upstream/downstream relationship with respect to the flow of exhaust gases therethrough has certain unique benefits. It is well within the scope of the skilled artisan to use the unique benefits of this catalyst system with other catalyst materials, promoters and stabilizers therefor. Thus, the appended claims are to be interpreted as not excluding from their coverage catalyst systems which use palladium and tungsten in the manner described in this specification, but use such materials in combination with other catalyst elements as well as promoters and stabilizers therefor.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. In a process for treatment of exhaust gases from an internal combustion engine, the steps of:
   burning a hydrocarbon fuel or a fuel containing hydrocarbons and alcohol blends in the internal combustion engine thereby to generate exhaust gases from the internal combustion engine containing various amounts of unburned hydrocarbons, carbon monoxide, and oxides of nitrogen depending upon operating conditions of the internal combustion engine; and
   passing said generated exhaust gases over an improved catalyst, comprising:
      a support medium for supporting a catalyst system, said support medium having both an upstream support portion over which exhaust gases initially flow and a downstream support portion over which exhaust gases flow after passing over said upstream support portion thereof;
      palladium on said upstream support portion of said support medium; and
      tungsten on said downstream support portion of said support medium, said downstream support portion of said support medium being free of palladium.

2. In a process of treatment of exhaust gases from an internal combustion engine, the steps of:
   burning a hydrocarbon fuel or a fuel containing hydrocarbons and alcohol blends in the internal combustion engine thereby to generate exhaust gases from the internal combustion engine containing various amounts of unburned hydrocarbons, carbon monoxide, and oxides of nitrogen depending upon operating conditions of the internal combustion engine; and
   passing said generated exhaust gases over an improved catalyst, comprising:
      a support medium for supporting a catalyst system, said support medium having both an upstream support portion over which exhaust gases initially flow and a downstream support portion over which gases flow after passing over said upstream support portion thereof;
      finely divided palladium on said upstream support portion of said support medium; and
      finely divided tungsten on said downstream support portion of said support medium, said downstream support portion of said support medium being free of finely divided palladium.

3. The catalyst system of claim 1, in which the support media is a gamma alumina coated monolithic substrate.

4. The catalyst system of claim 2, in which the support media is a gamma alumina coated monolithic substrate.

5. The catalyst system of claim 1, in which the support media is gamma alumina pellets.

6. The catalyst system of claim 2, in which the support media is gamma alumina pellets.

7. The catalyst system of claim 1, in which the support media is a washcoated metallic substrate.

8. The catalyst system of claim 2, in which the support media is a washcoated metallic substrate.

9. In a process for treatment of exhaust gases from an internal combustion engine, the steps of:
   burning a hydrocarbon fuel or a fuel containing hydrocarbons and alcohol blends in the internal combustion engine thereby to generate exhaust gases from the internal combustion engine containing various amounts of unburned hydrocarbons, carbon monoxide, and oxides of nitrogen depending upon operating conditions of the internal combustion engine; and
   passing said generated exhaust gases over an improved catalyst, comprising:
      a support medium for supporting a catalyst system, said support medium having both an upstream support portion over which exhaust gases initially flow and a downstream support portion over which exhaust gases flow after passing over said upstream support portion thereof;
      0.02 to 1.0% by weight of the upstream support portion of the substrate of finely divided palladium on said upstream portion of said support medium; and
      on said downstream support portion of said substrate, from 2 to 50 times the weight of palladium present on said upstream support portion of said substrate of finely divided tungsten, said downstream support portion of said substrate being free of palladium.

10. The method of claim 9, in which the support media for the catalyst system is a gamma alumina coated monolithic substrate.

11. The method of claim 9, in which the support media for the catalyst system is gamma alumina pellets.

12. The method of claim 9, in which the support media for the catalyst system is a washcoated metallic substrate.

13. The method of claim 9, in which said finely divided tungsten of the catalyst system is present from 5 to 20 times the weight of palladium present.

* * * * *